United States Patent [19]
Haven

[11] 3,911,855
[45] Oct. 14, 1975

[54] SERVICE CARD DISPENSER
[75] Inventor: Harold Arthur Haven, Hale, Mich.
[73] Assignee: General Motors Corporation, Detroit, Mich.
[22] Filed: Oct. 7, 1974
[21] Appl. No.: 512,476

[52] U.S. Cl. .......................... 116/114 W; 235/132 R
[51] Int. Cl.² .......................................... G01D 13/00
[58] Field of Search ..................... 235/95 R, 132 R; 116/114 R, 114 W, 114 AE

[56] References Cited
UNITED STATES PATENTS

| | | | |
|---|---|---|---|
| 1,610,639 | 12/1926 | Whittington | 116/114 W |
| 1,661,312 | 3/1928 | Smitaley | 116/114 W |
| 1,694,102 | 12/1928 | McMenemy | 116/114 W |
| 1,872,838 | 8/1932 | Smith | 116/114 W |
| 2,253,827 | 8/1941 | Vinton | 116/114 W |
| 2,493,437 | 1/1950 | Berry | 235/132 R |
| 2,578,358 | 12/1951 | Jellison | 235/132 R |
| 2,589,623 | 3/1952 | Merrit | 116/114 W |
| 2,601,838 | 7/1952 | Boates | 116/114 W |
| 2,656,817 | 10/1953 | Jones | 116/114 W |

Primary Examiner—Stephen J. Tomsky
Assistant Examiner—Vit W. Miska
Attorney, Agent, or Firm—K. H. MacLean, Jr.

[57] ABSTRACT

A mechanism for motor vehicles responsive to predetermined mileage intervals for indicating to the vehicle operator the desirability of servicing the vehicle. The mechanism includes an odometer type mileage sensor which, upon sensing a predetermined mileage interval, dispenses a service card from a slot in the instrument panel and simultaneously activates a warning light and/or buzzer.

4 Claims, 11 Drawing Figures

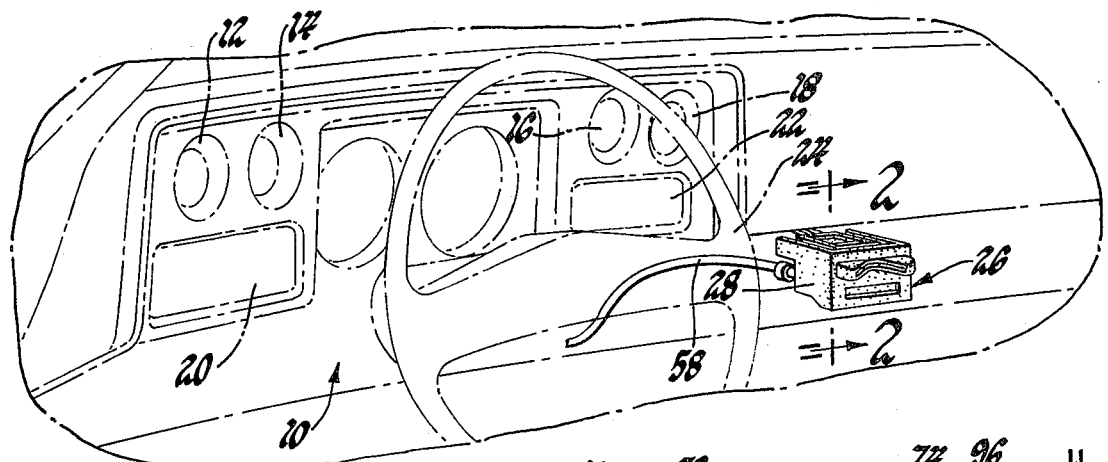
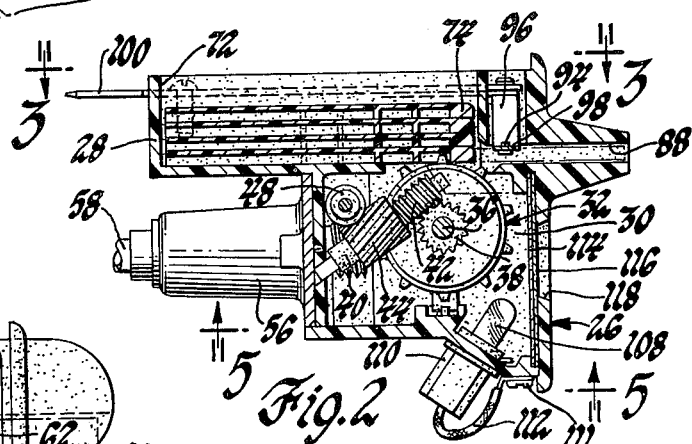
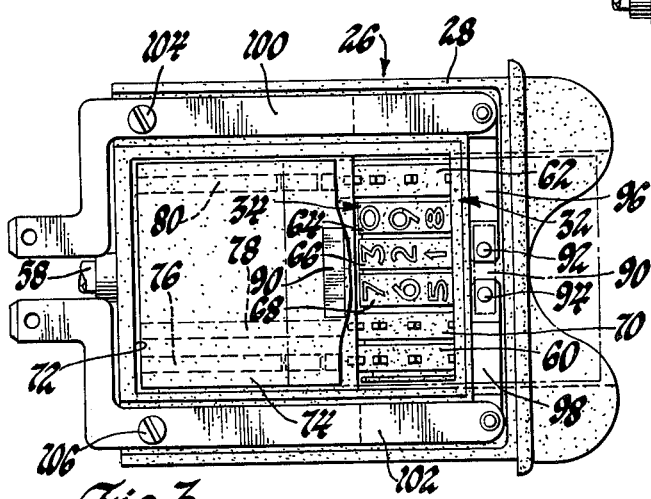
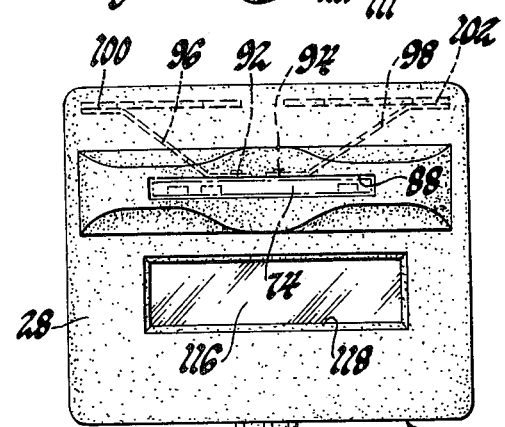
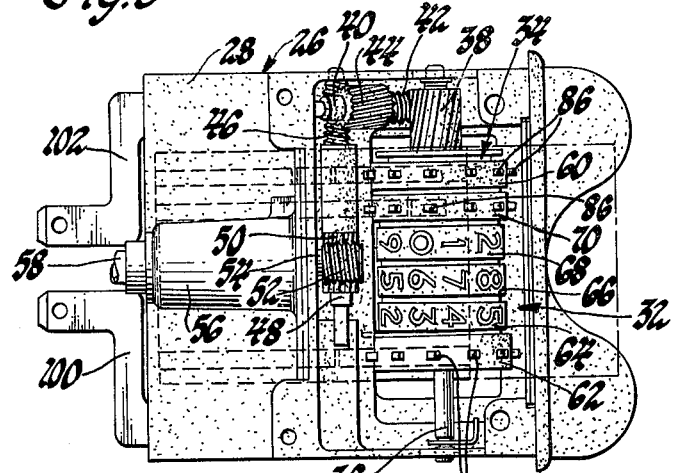
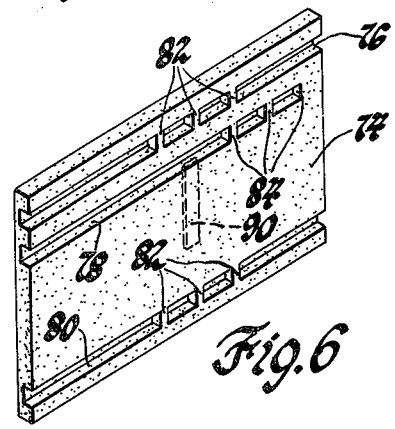

SERVICE CARD DISPENSER

The present invention relates to an indicating mechanism for a vehicle which senses a predetermined mileage interval and then alerts and indicates to the operator of the vehicle that a particular type of servicing is desirable.

The present invention provides a simple and effective mechanism to periodically remind a vehicle operator that a particular service function, such as an oil change, is desirable. The mechanism senses a predetermined mileage interval of the vehicle with a wheel-type odometer which is the type presently used in automobile speedometer-odometer assemblies. The odometer is connected to a rotatable cable, one end of which is connected to the vehicle drive mechanism. Resultant rotation of the odometer when the vehicle is driven moves the wheels of the odometer in a well known manner. Drive means on the odometer wheels, and particularly the thousand mile wheel, engage cogs on a service card and move the card into a position where it can be removed. Simultaneously, this positioning of the card activates a warning circuit to alert the driver as desirability to remove the card. The driver may then read a printed message on the card which will indicate which service function is to be performed.

An object therefor of the present invention is to provide an indicating mechanism utilizing an odometer-type mileage interval sensor to advise the operator of a vehicle as to the service needs of the vehicle at predetermined mileage intervals.

A still further object of the present invention is to provide a service indicating mechanism including a mileage interval sensor and having at least one but also the capacity for multiple service cards to be sequentially used by the mechanism after successive mileage intervals to alert the vehicle operator as to service requirements of the vehicle.

A still further object of the present invention is to provide a service indicating mechanism responsive to predetermined mileage intervals for dispensing a service card therefrom and also for activating a light or sound warning portion of the mechanism to prompt the vehicle operator to observe and follow the printed message on the service card.

Although the two embodiments of the invention illustrated in the drawings and hereinafter discussed in detail are preferred embodiments, other embodiments within the scope of the claims may be adapted.

IN THE DRAWINGS:

FIG. 1 is a perspective view of an automobile dashboard showing the service indicating mechanism;

FIG. 2 is a sectioned view taken along section line 2—2 in FIG. 1 and looking in the direction of the arrows;

FIG. 3 is a sectioned view taken along section lines 3—3 in FIG. 2 and looking in the direction of the arrows;

FIG. 4 is an elevational view of the front of the servicing indicating mechanism looking toward the dashboard;

FIG. 5 is a sectioned view taken along section line 5—5 in FIG. 2 and looking in the direction of the arrows;

FIG. 6 is a perspective view of one of the service cards shown in FIG. 2;

Figure 7:
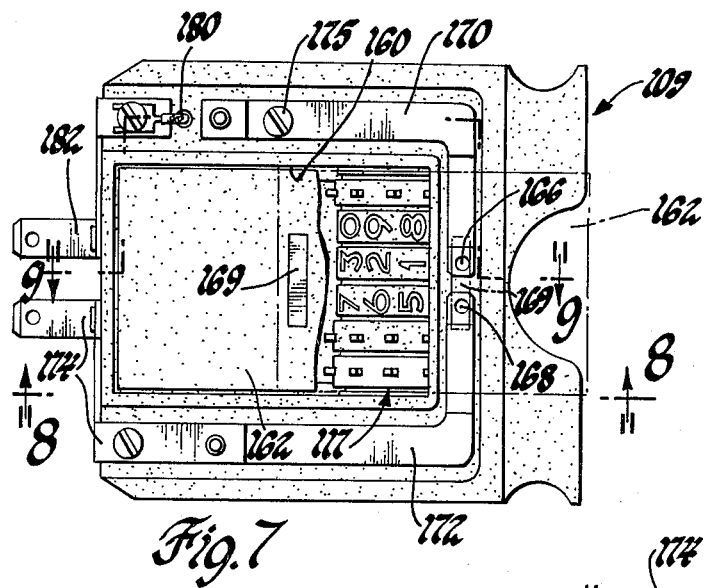
FIG. 7 is a planar view of a second embodiment of the service indicating mechanism similar to FIG. 3.

In FIG. 1 of the drawings, an automobile dashboard 10 is illustrated in broken lines. The dashboard 10 includes instrumentation or gauges 12, 14, 16 and 18 which may, for example, represent the fuel gauge, the water temperature gauge, the oil pressure gauge and the ammeter. Outlet openings 20, 22 are adapted to be connected to a forced ventilation system for delivering air to the passenger compartment. A steering column and wheel 24 extend from the dashboard for steering the vehicle. The dashboard 10 also supports the subject service indicating mechanism 26 which is shown in more detail in FIGS. 2 - 5. The mechanism 26 includes a housing 28 which is preferably made of a rigid but moldable plastic material. Housing 28 encloses an interior space 30 in which a mileage sensing mechanism such as a wheel-type odometer 32 is supported. An odometer of this type is disclosed in U.S. Pat. No. 2,117,024 to Helgeby et al which was issued May 10, 1938. The odometer basically consists of a plurality of adjacent wheels 34 which are rotatably supported upon a common shaft 36. The shaft 36 is free to rotate in the housing 28 and is rotated by a gear 38 fixedly attached at one end. The gear 38 is engaged by a rotatable shaft member 40 supported within space 30 normal to the axis of shaft 36. Member 40 has a worm gear portion 42 on one end which engages gear 38. The other end of shaft 40 has a helical gear 44 adapted to engage a worm gear portion 46 of a second shaft member 48. Shaft member 48 is supported for rotation within space 30 by housing 28 with its axis parallel to the axis of shaft 36. The shaft 48 has a gear portion 50 which engages a worm gear 52 on the end of a shaft 54 extending normal to shaft 48. Shaft 54 is housed in a bushing 56 attached to housing 28. The exterior end of bushing 56 is adapted to be connected to a rotatable cable member 58 which is connected to a gear in the vehicle transmission so that movement of the vehicle will cause rotation of the cable and resultant turning of the shafts 48, 40 and 36.

The movement of the automobile causes the odometer wheels 34 to rotate. Wheels 60 and 62 on either end of shaft 36 rotate at the same speed as the shaft 36. The gear in the vehicle transmission, not shown, and the gears 38, 42, 44, 40, 50 and 52 are selected so that the wheels 60 and 62 rotate 1/10 of a revolution every 1/10 of a mile or one revolution per mile of vehicle travel. The wheel 64 adjacent to wheel 62 may be called the digital wheel and it is rotated 1/10 of a rotation per every complete rotation of wheel 62 or per mile of vehicle travel. Adjacent to wheel 64 is another wheel 66 which indicates tens of miles of vehicle travel and it is rotated 1/10 of a rotation for every complete rotation of wheel 64 or per ten miles. Adjacent to wheel 66 is another wheel 68 which indicates hundreds of miles of operation and it is rotated 1/10 of a rotation for each complete rotation of wheel 66 or per 100 miles. The remaining wheel 70 represents thousands of miles of vehicle operation and it is rotated 1/10 of a rotation for each complete rotation of wheel 68 or per 1000 miles. For further details of the odometer construction utilized in the present invention, reference is made to the aforementioned patent.

The upper portion of housing 28 forms a rectangular recess 72 located above the odometer 32. The recess 72 is adapted to support at least one service indicator card 74 as shown in FIG. 6. The cards 74 are generally rectangular and molded of plastic material. FIG. 6 shows the bottom side of an indicator card more clearly. The card 74 has three parallel channels or grooves 76, 78 and 80 formed therein. The grooves 76 and 80 are identical and have thin partitions 82 extending normal to the axis of the channels near the midpoint of the card. The channel 78 also has wall partitions 84 but they are located near one end of the card 74. The channels 76, 78 and 80 are aligned with the wheels 60, 70 and 62, respectively, when the card is placed in the recess 72 as shown in FIG. 2. Ten teeth or cogs 86 are spaced circumferentially on the wheels 60, 62 and 70 and aligned within grooves 76, 78 and 80. When the thousand mile wheel 70 turns 1/10 of a rotation in response to a 1000 miles of vehicle operation, the uppermost tooth 86 on wheel 70 engages the wall portion 84 in groove 78 and advances the card 74 to the right in FIG. 2. Housing 28 has a slot 88 in its front face which is best shown in FIGS. 2 and 4 through which card 74 is advanced. After 3/10 of a revolution of the thousand mile wheel 70, or 3,000 miles, the card 74 will have been moved to the right far enough to engage the teeth 86 on wheels 60 and 62 with walls 82 in grooves 76 and 80. Since wheels 60 and 62 rotate rapidly at a rate of 1 revolution per mile, the card is thereafter rapidly moved to the right in FIG. 2 through the slot 88. After a predetermined move of the card out of slot 88, conductive bar 90 embedded in the card 74 is aligned with and resultantly connects two contacts 92 and 94 which are supported on the ends of resilient spring-conductor members 96, 98. The upper ends of the connector members 96 and 98 are electrically connected to terminals 100 and 102 which are attached to housing 22 by fasteners 104, 106. Terminal members 100, 102 are adapted to be connected to a warning circuit such as a light 108 and/or a buzzer. When the buzzer sounds and the light is energized, the driver of the vehicle is alerted that service of the vehicle is required and that the service card which projects from slot 88 can be withdrawn so that the instructions printed thereon may be followed.

The warning light 108 is supported in a socket member 110 and one side is connected by screw 111 and to terminal 100 and wire 112. The other side or terminal is connected to a circuit containing a battery. Light from the bulb 108 brightens the interior 30 of housing 28 and light escapes through a window 118 in housing 28. A plastic defuser sheet 114 and a colored plastic sheet 116 covering the window 118 prevent dust from entering housing 28. The colored plastic sheet 116 may have darkened areas in the form of lettering which may read "Service needed - Please pull card."

A second embodiment of the present invention is illustrated in FIGS. 7 – 11. This embodiment is similar to the first embodiment shown in FIGS. 1 – 6 but instead of a cabledriven odometer, a step-type electric motor is utilized to rotate the odometer at a speed corresponding to a variable frequency sawtooth electric signal produced by vehicle movement. The service indicator mechanism 109 includes housing 113 having an interior 115. An odometer mechanism 117 is supported upon a shaft 119 in housing 113. A gear 120 is affixed to shaft 119 and meshes with a worm gear portion 122 of a shaft 124. Shaft 124 is supported for rotation in the housing 113 and has a helical gear portion 126 engaging a worm gear portion 128 on a rotative shaft of a small step-type electric motor 130. The motor 130 is supported within the housing 113 by a collar portion 132 which engages one end of the motor 130. The motor 130 is held against portion 132 by a fastener 134 which is threadably inserted into a grommet member 136 and bears against the end of motor 130. Motor 130 has two wires extending therefrom which are connected to terminals 138, 140. The terminals 138, 140 are adapted to be connected to generator, such as a well known magnetic type pulse-producing device. The generator produces a peaked or sawtooth variable frequency signal in response to rotation of the vehicle drive mechanism. The peaked or sawtooth output of the generator is applied to motor 130 and this causes the motor to rotate at a speed proportionsl to the speed of the vehicle. Resultantly, the odometer 117 rotates in response to the speed of the vehicle which in turn corresponds to the distance the vehicle has operated or mileage interval.

The odometer shown in FIGS. 7–11 is identical to the odometer disclosed and described in regard to the embodiment shown in FIGS. 1 – 6. Briefly, wheels 142, 144 are 1/10 mile wheels which rotate 1/10 of a revolution with each tenth of a mile of vehicle travel. Wheel 146 is a one-mile indicator wheel which rotates 1/10 of a revolution with each mile of vehicle operation. Wheel 148 is a 10 -mile indicator wheel and rotates 1/10 of a revolution with each 10 miles of vehicle operation. Wheel 150 is a 100-mile wheel which rotates 1/10 of a revolution with each 100 miles of vehicle operation. Lastly, wheel 152 is a 1000-mile wheel which rotates 1/10 of a revolution with each 1000 miles of vehicle operation. Wheels 142, 144 and 152 have teeth 154 thereon which are adapted to extend through an opening 156 in an upper portion 158 of housing 112. The upper portion 158 also forms a recess 160 in which service indicator cards 162 are stacked.

Figure 8:
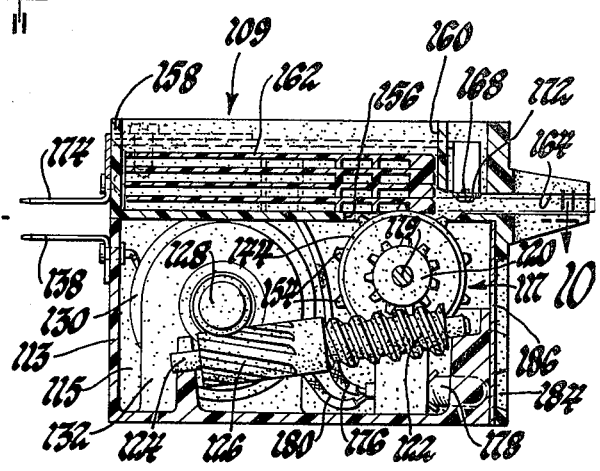
FIG. 8 is a sectioned view of the mechanism shown in FIG. 7 and taken along section line 8—8 and looking in the direction of the arrows.
Figure 9:
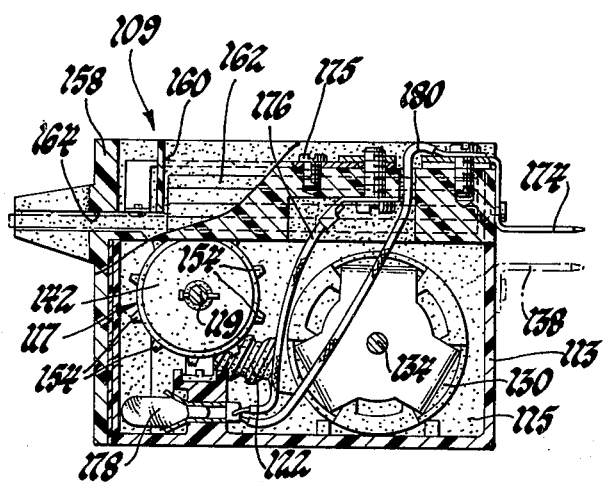
FIG. 9 is a sectioned view of the subject mechanism taken along section line 9—9 in FIG. 7 and looking in the direction of the arrows.
Figure 10:
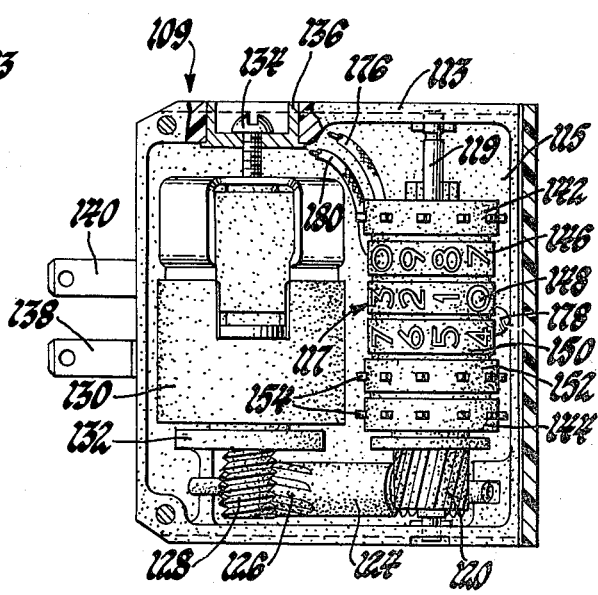
FIG. 10 is a sectioned view of the mechanism taken along section line 10—10 in FIG. 8 looking in the direction of the arrows.
Figure 11:
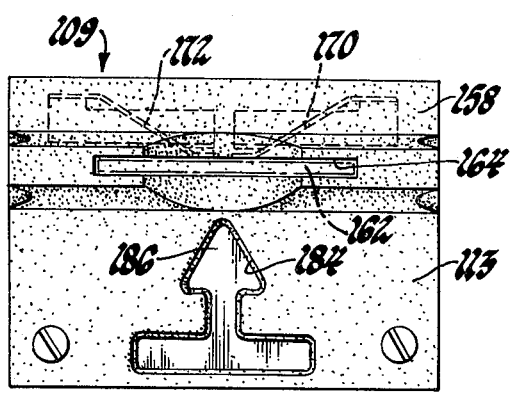
FIG. 11 is an elevational view of the front of the mechanism shown in FIG. 7 looking toward the dashboard as the vehicle operator would observe the mechanism.

In the manner previously described, operation of the vehicle over a 3,000 mile interval will cause the lowest service card to move to the right in FIG. 8 and enter slot 164. After a predetermined movement of the card by movement of teeth 154 on wheel 162, the teeth 154 on wheels 142, 144 then engage the partitions on the card 162 and rapidly move it to a position in the slot 164 whereby a conductor bar 169 (see FIG. 7) engages contacts 166, 168 to complete a circuit through conductors 170, 172. Conductor 172 is connected to a terminal member 174 which is adapted to be connected to the battery of the vehicle. The conductor 170 is connected by fastener 175 and a wire 176 shown in FIGS. 7, 9 to a light bulb 178 whose other terminal is connected by a wire 180 to a terminal 182 which is adapted to be connected to the vehicle battery. When the warning circuit is energized by connection of contacts 166, 168 by conductor bar 169, bulb 178 is energized and a noise-emitting buzzer may be energized. The bulb 178 directs light through a cut-out window portion 184 in the front of housing 113. A transparent member 186 is thus illuminated by the light to advise the vehicle operator to remove the service card 162 from the slot 164 and follow the instructions thereon.

Although the two embodiments illustrated are preferred embodiments, it is understood that modification of these two basic embodiments may be made within the scope of the following claims.

What is claimed is as follows:

1. A service indicating mechanism for a vehicle responsive to mileage intervals to inform an operator of periodic service requirements comprising:

a housing supported by the vehicle dashboard and having a front face visible from the vehicle passenger compartment;

mileage counting means including first and second portions which move after corresponding first and second mileage intervals;

said housing forming a recess above said mileage counting means and said movable portions;

at least one service indicator card supported in said recess;

track-forming means including said recess and a slot in the front face of said housing for directing movement of said service card out from said recess, through said slot and away from said face of said housing to expose a portion of said card to the vehicle passenger compartment;

means on said service card coactive with said first and second movable portions of said mileage counting means to initially move the service card toward said slot at a first predetermined rate proportional to said first mileage interval and subsequently to move said service card through said slot into said vehicle passenger compartment at an accelerated second rate proportional to said second and smaller mileage interval.

2. A service indicating mechanism to inform an operator of a vehicle of desirable service functions at periodic mileage intervals comprising: a housing defining an interior space; an odometer mechanism supported for rotation in said space; said odometer mechanism having a shaft on which a plurality of wheels are supported for rotation; means including gears operably connected to said shaft to cause rotation of the shaft at a variable speed proportional to the rate of vehicle motion; said wheels being operably connected so that one rotation of a wheel produces a fractional rotation of the next adjacent wheel whereby a first wheel rotates at a rapid rate corresponding to miles of vehicle operation and another wheel rotates at a rate corresponding to thousands of miles of vehicle operation; a recess formed in said housing above said odometer wheels; service-indicating cards vertically stacked in said recess; said cards having channels which extend in parallel to each other; one channel having its axis aligned tangentially with said second odometer wheel; another channel having its axis aligned tangentially with said first odometer wheel; teeth formed on the circumferential perimeters of said wheels and extending into said channels; spaced partition means in said channels for engagement by said teeth to move said card in a tangential direction with respect to said wheels; said partition means being spaced along the axes of said channels and with respect to said wheels to provide an initial slow movement of said service card with respect to said housing produced by fractional rotation of said other wheel followed by a more rapid movement produced by rotation of said first wheel to advance said card into position to enable the operator to grip and remove the card.

3. The service indicating mechanism of claim 1 in which said rotation-producing means of said odometer mechanism includes a variable speed electric motor operably connected to said odometer and a generator which produces an input signal to said motor corresponding to the rate of vehicle movement.

4. A service indicating mechanism to inform an operator of a motor vehicle of desirable service functions at periodic mileage intervals comprising: a housing defining an interior space; an odometer mechanism supported for rotation in said space; said odometer mechanism having a shaft on which a plurality of wheels are supported for rotation; means including gears operably connected to said shaft to cause rotation of the shaft at a variable speed proportional to the rate of vehicle motion; said wheels being operably connected so that one rotation of a wheel produces a fractional rotation of the next adjacent wheel whereby a first wheel rotates at a rapid rate corresponding to miles of vehicle operation and another wheel rotates at a rate corresponding to thousands of miles of vehicle operation; a recess formed in said housing above said odometer wheels; service indicating cards vertically stacked in said recess; said cards having channels which extend in parallel to each other; one channel having its axis aligned tangentially with said second wheel; another channel having its axis aligned tangentially with said first wheel; teeth formed on the circumferential perimeters of said wheels and extending into said channels; spaced partition means in said channels for engagement by said teeth to move said card in a tangential direction with respect to said wheels; said partition means being spaced along the axes of said channels and with respect to said wheels to provide an initial slow movement of said service card produced by fractional rotation of said other wheel followed by a second more rapid movement produced by rotation of said first wheel to advance said card into a position to enable the operator to grip and remove said service card; conductor means supported by said housing including a pair of spaced contact members which engage a surface of said indicating card; said service card having a conductive connector thereon adapted to electrically connect said contact pair after said second movement of said service card; an indicating circuit connected in series with said contact pair and energized thereby to alert the vehicle operator.

\* \* \* \* \*